(12) United States Patent
Martincigh et al.

(10) Patent No.: US 11,127,510 B2
(45) Date of Patent: Sep. 21, 2021

(54) ELECTROCONDUCTIVE COMPOSITE

(71) Applicant: UNIVERSITY OF KWAZULU-NATAL, Westville (ZA)

(72) Inventors: Bice Susan Martincigh, Durban (ZA); Werner E. Van Zyl, Westville (ZA); Vincent O. Nyamori, Durban (ZA); Moses Abednego Ollengo, Durban (ZA); Vashen Moodley, Durban (ZA); Edwin Tonderai Mombeshora, Durban (ZA)

(73) Assignee: University Of Kwazulu-Natal

( * ) Notice: Subject to any disclaimer, the term of this patent is extended or adjusted under 35 U.S.C. 154(b) by 0 days.

(21) Appl. No.: 16/494,682

(22) PCT Filed: Mar. 12, 2018

(86) PCT No.: PCT/IB2018/051611
§ 371 (c)(1),
(2) Date: Sep. 16, 2019

(87) PCT Pub. No.: WO2018/167634
PCT Pub. Date: Sep. 20, 2018

(65) Prior Publication Data
US 2020/0211730 A1  Jul. 2, 2020

(30) Foreign Application Priority Data

Mar. 17, 2017  (ZA) .................. 2017/01896

(51) Int. Cl.
*H01B 1/24* (2006.01)
*C08K 3/04* (2006.01)
(Continued)

(52) U.S. Cl.
CPC ............. *H01B 1/24* (2013.01); *C08K 3/042* (2017.05); *C08L 1/04* (2013.01); *H01B 13/30* (2013.01);
(Continued)

(58) Field of Classification Search
CPC .......... H01B 1/08; H01B 12/24; B82Y 30/00; C08K 3/042; C08L 1/12
(Continued)

(56) References Cited

U.S. PATENT DOCUMENTS

2017/0140848 A1* 5/2017 Abidi .................. C08L 1/02

FOREIGN PATENT DOCUMENTS

| CN | 102489259 A | * | 6/2012 | ............. B01J 20/30 |
| EP | 2889400 A1 | * | 7/2015 | ............. D01F 1/10 |
| WO | WO 2012/129659 | | 10/2012 | |

OTHER PUBLICATIONS

Wang "Relationship between dispersion state and reinforcement effect of graphene oxide in microcrystalline cellulose-graphene oxide composite films." J. Mater. Chem., 2012, 22, 12859 (Year: 2012).*

(Continued)

*Primary Examiner* — Tri V Nguyen
(74) *Attorney, Agent, or Firm* — Sheridan Ross PC

(57) ABSTRACT

An electroconductive composite comprises a matrix of nanocrystalline cellulose and graphene oxide. The matrix is, in at least a region thereof, unipolar by having, in that region, either p-type charge carrier conductivity or n-type charge carrier conductivity depending on the mass concentration of nanocrystalline cellulose in that portion of the matrix.

7 Claims, 4 Drawing Sheets

(a)

(b)

(51) Int. Cl.
C08L 1/04 (2006.01)
B82Y 30/00 (2011.01)
H01B 13/30 (2006.01)

(52) U.S. Cl.
CPC ......... *B82Y 30/00* (2013.01); *C08K 2201/001* (2013.01)

(58) Field of Classification Search
USPC ........................................ 252/500, 502, 510
See application file for complete search history.

(56) References Cited

OTHER PUBLICATIONS

Chen et al. "Tunable self-assembly structure of graphene oxide/cellulose nanocrystal hybrid films fabricated by vacuum filtration technique," RSC Adv., Jan. 2014, vol. 4, No. 74, pp. 39301-39304.
Kafy et al. Synthesis and characterization of cellulose nanocrystal/graphene oxide blended composite, Proceedings Optical Diagnostics of Living Cells II, SPIE, Apr. 2016, vol. 9802, pp. 980204, 5 pages.
Kafy et al. "Cellulose nanocrystal/graphene oxide composite film as humidity sensor," Sensors and Actuators A: Physical, Jun. 2016, vol. 247, pp. 221-226.
Valentini et al. "A novel method to prepare conductive nanocrystalline cellulose/graphene oxide composite films," Materials Letters, Apr. 2013, vol. 105, pp. 4-7.
International Search Report and Written Opinion prepared by the European Patent Office dated May 25, 2018, for International Application No. PCT/IB2018/051611.

* cited by examiner

ELECTROCONDUCTIVE COMPOSITE

CROSS REFERENCE TO RELATED APPLICATIONS

This application is a national stage application under 35 U.S.C. 371 and claims the benefit of PCT Application No. PCT/IB2018/051611 having an international filing date of 12 Mar. 2018, which designated the United States, which PCT application claimed the benefit of South Africa Patent Application No. 2017/01896 filed 17 Mar. 2017, the disclosures of each of which are incorporated herein by reference in their entireties.

This invention relates to an electroconductive composite, particularly an electroconductive thin film composite. It relates also to a process for producing such a composite, and to uses of the composite.

The electronic application of organic semiconducting materials depends on the availability of both p- and n-type charge carriers. The ease of fabricating well defined sequential layers, or spatial patterns, of these charge carriers determines the output and range of applications. Fabrication of graphene based organic semiconductors is of great interest because of the properties they exhibit, with potential application in various fields.

One such material for fabrication of graphene based organic semiconductors is graphene oxide. Graphene oxide is a material known to contain numerous oxide functionalities; mainly alcohols and epoxides on the basal plane. It has significant structural similarity to graphite, but exhibits a much longer interlayer spacing in the range of 6-12 Å. The layer separation distance is subject to humidity levels and degree of water intercalation. Due to weaker $\pi$-$\pi$ stacking forces and strong electrostatic repulsions between negatively charged sheets a solution of graphene oxide in water appears thermodynamically stable. The presence of several oxygen-bearing functional groups on the basal plane and the sheet edge allows graphene oxide to interact with a wide range of materials through hydrogen, covalent and/or ionic bonding to form hybrids and composites. The presence of both $sp^2$- and $sp^3$-hybridized carbon atoms causes graphene oxide sheets to have poor or no translational symmetry. The carbon atoms attached to functional groups are, thus, slightly displaced although the overall size of the unit cell in graphene oxide is generally similar to that of a monolayer of graphene. The functional groups protruding from the graphene oxide planes are expected to decouple the interactions between the C=C, $sp^2$ domains in the carbon backbones of neighbouring layers. However, the topological defects and oxygen functional groups may form stronger physical bonds, especially with polar guests, when such polar guests are used to form composites with graphene oxide.

Generally, graphene oxide composites are ambipolar. Hitherto, to break the symmetry of ambipolar characteristics of graphene oxide composites, such composites have been doped. Thus, traditionally, this has been done by doping an ambipolar device, for instance, a silicon chip, to p-type or n-type depending on the dopant. However, such doping techniques are time-consuming and labour intensive.

It is an object of this invention to provide a graphene oxide composite whereby this drawback is at least ameliorated.

Thus, according to a first aspect of the invention, there is provided an electroconductive composite, which comprises a matrix of nanocrystalline cellulose (NCC) and graphene oxide (GO), with the matrix being, in at least a region thereof, unipolar by having, in that region, either p-type charge carrier conductivity or n-type charge carrier conductivity depending on the mass concentration of nanocrystalline cellulose in that portion of the matrix.

The composite may be in the form of a film, particularly a thin film. In this specification, reference to a thin film means a film with a thickness typically less than 24 µm.

The composite may be characterized thereby that it contains no dopant, or no elemental dopant, such as an element from Group V of the Periodic Table of Elements, e.g. phosphorus, for n-type doping, and/or an element from Group III of the Periodic Table of Elements, e.g. boron, for p-type doping.

In one embodiment of the invention, the mass proportion or mass concentration of NCC in the matrix/composite may be ≤7% or ≥35%. The composite then has a p-type, or at least a predominantly p-type, charge carrier conductivity. The mass concentration of NCC may then be ≤5%, e.g. about 5 mass % or about 1 mass %, or may be ≥40% e.g. about 50 mass %.

In another embodiment of the invention, the mass proportion or concentration of NCC in the matrix/composite may be >7% and <35%. The mass concentration of NCC may then be >8% and <35%, e.g. about 10 mass % or about 20 mass %, which is believed to be the optimal for n-type characteristic. The composite then has a n-type, or at least a predominantly n-type, charge carrier conductivity.

In this specification, a mass concentration is the concentration of an ingredient as a percentage of the mass of a unit of the composite. Thus, a NCC mass concentration of 20% (i.e. 20 mass %) means that the composite, on a mass basis, comprises 20% NCC.

The region of the matrix which is unipolar may be the entire matrix. In other words, the entire matrix, and hence the entire composite, may have either p-type charge carrier conductivity, or n-type charge carrier conductivity. However, instead, at least one region of the matrix may have p-type charge carrier conductivity, while at least one other region thereof may have n-type charge carrier conductivity. This is achieved when a junction is intentionally created by way of fabrication, thus forming a p/n junction or a n/p junction, as the case may be. A bipolar junction in the form of n/p/n or p/n/p characteristic, is also possible.

The matrix, and hence the composite, may be that obtainable by mechanophysical mixing of NCC and GO. The electroconductive composite may thus be in the form of an electroconductive film composite, preferably an electroconductive thin film composite, obtained by dispersing graphene oxide (GO) and nanocrystalline cellulose (NCC) in a carrier liquid to form a suspension, producing a raw matrix body in the form of a film from solids present in the suspension, and drying the raw matrix body to form an electroconductive film composite.

More particularly, the matrix may be that obtainable by dispersing graphene oxide (GO) in a carrier liquid, such as water, adding nanocrystalline cellulose (NCC) to the dispersion to form a suspension, producing a raw matrix body, such as a film or a thin film, from solids present in the suspension, and drying the raw matrix body to form the electroconductive film composite or the electoconductive thin film composite.

Thus, according to a second aspect of the invention, there is provided, broadly, a process for producing an electroconductive composite, which process comprises dispersing graphene oxide (GO) in a carrier liquid to form a dispersion or solution;

adding nanocrystalline cellulose (NCC) to the dispersion or solution, to form a suspension, the mass concentration of nanocrystalline cellulose in the suspension being selected to obtain an electroconductive composite comprising a matrix of nanocrystalline cellulose and graphene oxide, with the matrix being, in at least a region thereof, unipolar by having, in that region, either p-type charge carrier conductivity or n-type charge carrier conductivity;

producing a raw matrix body from solids present in the suspension; and drying the raw matrix body to obtain an electroconductive composite comprising a matrix of nanocrystalline cellulose and graphene oxide, with the matrix being, in at least a region thereof, unipolar by having, in that region, either p-type charge carrier conductivity or n-type charge carrier conductivity depending on the mass concentration of nanocrystalline cellulose in that portion of the matrix.

The electroconductive composite may be an electroconductive thin film composite.

Producing a raw matrix body from solids present in the suspension may thus include producing a thin film composite from solids present in the suspension. Typically, this is achieved by transferring the suspension (i.e. a colloidal composite solution) to a container open to the atmosphere, e.g. a petri-dish, and allowing a slow evaporation of the carrier liquid, e.g. water, in a controlled dust-free environment. A thin film is left behind as the carrier liquid or solvent evaporates, which is then mechanically peeled off.

The carrier liquid may thus be water so that a dispersion of GO in water is obtained. The dispersion may be effected with mixing, e.g. ultrasonically. The mixing may thus be effected by subjecting the dispersion to an ultrasound water bath treatment for a period of time, $t_1$. Preferably 5 mins$\leq t_1 \leq$20 mins, more preferably $t_1$ may be about 10 mins.

The NCC may be added to the dispersion as a colloidal solution, and the addition thereof may be effected while mixing, e.g. stirring, the dispersion. The process may include mixing, e.g. stirring, the suspension, once formed, e.g. after addition of all the NCC colloidal solution, for a period of time, $t_2$. Preferably, 5 mins$\leq t_2 \leq$20 mins, more preferably $t_2$ may be about 10 mins. The suspension may thereafter be subjected to ultrasonic water bath treatment for a period of time, $t_3$. Preferably, 20 mins$\leq t_3 \leq$40 mins, more preferably $t_3$ may be about 30 mins.

Production of the raw matrix body may include mechanophysical mixing of NCC and GO colloidal solutions.

The drying or dehydration of the raw matrix body may be effected at an elevated temperature, T, and for a period of time, $t_4$. Preferably, 40° C.$\leq T \leq$100° C.; more preferably, 40° C.$\leq T \leq$70° C.; typically T is about 50° C. Preferably, 24 hrs$\leq t_4 \leq$72 hrs; more preferably 20 hrs$\leq t_4 \leq$60 hrs; typically, $t_4$ is about 48 hrs.

In the process, GO and NCC will thus initially be used in a predetermined mass proportion, to obtain a composite or matrix having a predetermined mass proportion or concentration of NCC so that said region of the composite or matrix has either p-type or an n-type charge carrier conductivity. The mass proportion or mass concentration of NCC in the matrix or composite may be as hereinbefore described in respect of the first aspect of the invention.

The invention extends also to a composite when produced by the process of the second aspect of the invention. In particular, the invention extends to an electroconductive composite when produced by the process of the second aspect of the invention, the electroconductive composite comprising a matrix of nanocrystalline cellulose and graphene oxide, with the matrix being, in at least a region thereof, unipolar by having, in that region, either p-type charge carrier conductivity or n-type charge carrier conductivity depending on the mass concentration of nanocrystalline cellulose in that portion of the matrix.

According to a third aspect of the invention, there is provided the use of an electroconductive composite according to the first aspect of invention, or the use of an electroconductive composite when produced by the process of the second aspect of the invention, in the manufacture of an artefact.

According to a fourth aspect of the invention, there is provided an artefact which includes an electoconductive composite according to the first aspect of the invention, or an electroconductive composite when produced by the process of the second aspect of the invention.

The artefact is thus a semiconducting artefact, and may find application in low power-consuming electronic devices, optoelectronic devices, spintronics, diodes, transistor technology, thermoelectric generators, and other industrial uses.

The invention will now be further described, by way of an Example and with reference to the accompanying drawings.

EXAMPLE

Background

Figure 1:
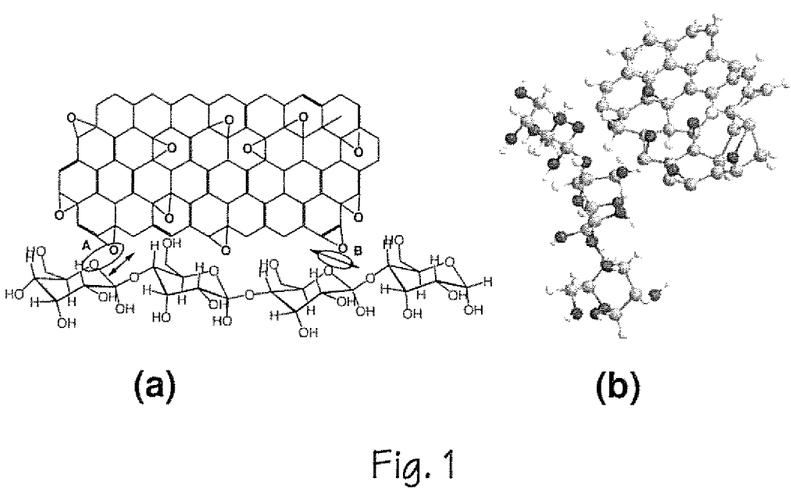
FIG. 1 shows a schematic illustration of (a) diagonal disorder denoted by A and off-diagonal disorder denoted by B in a NCC/GO composite arising from the epoxy oxygen on GO and the oxygen in the NCC and (b) a 3D image of the layers showing distortions in the GO layer.

During preliminary investigations, the inventors realized that the high number of OH groups on the surface of nanocrystalline cellulose are likely to favour hydrogen bonding, thereby, occasioning a bilayer assemblage of graphene oxide and cellulose chains in a highly ordered thin film (as shown in FIGS. 1a and 1b). In this regard, the hydrogen bonding becomes the binding force between a nanocrystalline cellulose film sandwiched between two graphene oxide sheets, thereby forming a composite film. The nanocrystalline cellulose has been assumed to form a thin layer of rods in between the graphene oxide monolayers since it assumes nematic order in colloidal dispersions occasioned by whisker entanglements. The resulting shape-anisotropy creates an ordered arrangement that seems to originate from chirality of the cellulose chains. It was thus realized that the interaction between the chiral surfaces and the twisted morphology of nanocrystalline cellulose and the overlaying graphene oxide monolayer could provide an avenue for response to external applied electric or magnetic fields.

The inventors thus sought to demonstrate a topological conductivity of a graphene oxide/nanocrystalline cellulose composite (NCC/GO). They also sought to show the tuning of the charge carrier characteristic of the composite, and the fabrication of a unipolar semiconductive device.

Materials and Methods

Preparation of Nanocrystalline Cellulose (NCC):

The NCC was prepared from dissolving pulp, obtained from the Sappi Southern Africa Saiccor mill, from a hard wood source, by means of hydrolysis with sulfuric acid (65% m/m). A mass of 5 g of dissolving pulp was mixed with 100 mL of sulfuric acid aqueous solution, and the mixture was stirred vigorously (700 RPM) at 64° C. for 1 hour. The mixture was diluted 10-fold with deionized water to stop the hydrolysis reaction and the diluted mixture was then centrifuged at 9000 RPM on a Hettich Zentrifugen, Universal 320 R, centrifuge, for 15 min to concentrate the cellulose and remove excess aqueous acid. A precipitated solid material was rinsed with distilled water and centrifuged again; this process was repeated 3 times. The material was subsequently dialyzed in Sigma-Aldrich dialysis sacks (avg. flat width 25 mm, MWCO 12,000 Da), against deionized water for one week until a pH of 7 was reached. The dialyzed nanocellulose was sonicated in an ultrasonic bath (UP400S 400W, Hielscher Co., Germany), for 5 min under cooling in an ice bath at 75% output and 0.7 cycles to obtain a NCC colloidal solution.

Synthesis of Graphene Oxide (GO) and NCC/GO Composite

Graphite powder (<150 μm, 99.99%) was purchased from Sigma Aldrich, USA. $KMnO_4$ (99%) and $NaNO_3$ (99%) were both purchased from Associated Chemical Enterprise, South Africa. $H_2SO_4$ (98.37%) was bought from Cc Imelmann Ltd, South Africa and $H_2O_2$ (30%) was obtained from Merck Ltd, South Africa. The products were washed with double deionized water (DI).

GO was synthesized using a modified Hummer's method (Hummers W S, Offeman R E. Preparation of graphitic oxide. *Journal of the American Chemical Society* 1958, 80(6): 1199-1339). In a typical synthesis, graphite and $H_2SO_4$ were added into a reaction vessel. To the mixture was added $NaNO_3$, while the mixture was kept in an ice water bath under stirring. Afterwards, $KMnO_4$ was added at a slow rate, ensuring that the temperature remains below 15° C. The water bath was removed and the reaction temperature was then increased to 50° C. $H_2O_2$ was added, followed by several cycles of washing with double deionized water (DI) until the filtrate reached a neutral pH. The concentration of the synthesized GO was determined by accurately weighing duplicate aliquots. The aliquots were dried overnight in an oven set at 50° C. The aliquots were reweighed and the concentration was expressed as the average mass of the duplicate aliquots after drying over average mass before drying. This was then followed by NCC/GO composite synthesis.

NCC/GO composites were synthesized by dispersing a predetermined mass of GO in water in an ultrasonic water bath treatment for 10 min. Thereafter, a predetermined volume of NCC was added under stirring, followed by further stirring and ultrasonic water bath treatment for 10 and 30 min, respectively. Composite films were formed by transferring the resultant composite solution to a petri-dish and allowing a slow evaporation of water in a controlled dust-free environment, whereafter the films were dried at 50° C. for 48 hrs in an oven. In particular, composites having 1%, 5%, 10%, 20% and 50% (by mass) concentrations of NCC (with the balance being GO) were produced and tested.

Reflectance Measurement

The UV-visible-NIR spectra of the films were recorded on PerkinElmer lambda 35 double beam UV-vis spectrometer fitted with a Labsphere RSA-PE-20 integrating sphere.

Atomic Force Microscopy

Atomic Force Microscopy (AFM) was performed with Solver P47H base with a SMENA head, manufactured by NT-MDT (Russia). The cantilever of choice was SuperSharpSilicon™ SPM-Sensors (SSS-NCLR, Nanosensors™) with a resonance frequency of 146-236 kHz; Force constant of 21-98 N/m; Tip radius 2 nm (typical), the scan rate ranged from 0.6-1.6 Hz. Thin films of variable % NCC/GO composition were anchored on a glass slide by the help of double adhesive tape before analysis. The AFM, 2D scale was used to estimate film thickness.

Hall Effect Measurements

Anomalous Hall effect and conductivity measurements were carried out at room temperature with a conventional Hall probe and four-probe method without a magnetic field. The current and the Hall voltage were measured by use of an electrometer (Keithley 617) and a digital multimeter (Fluke 87), respectively.

Results

Figure 2:
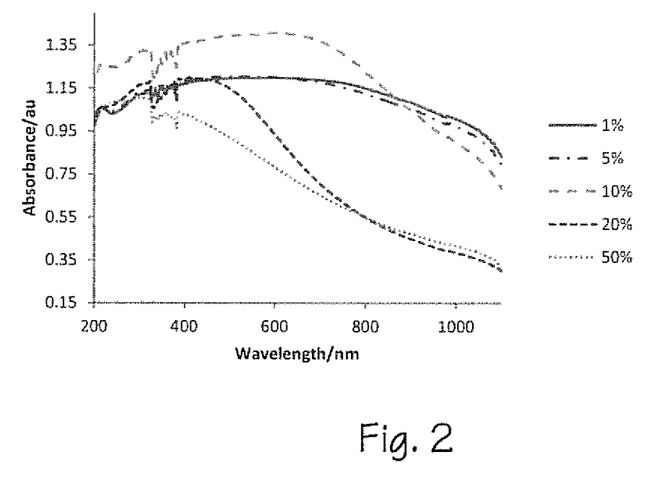
FIG. 2 shows, in respect of the Example, the UV-visible-NIR spectra of variable mass % NCC in NCC/GO composite thin films.

From a comparison of graphene and GO, it is noticeable that GO exhibits an energy band gap with a marked change in charge hopping parameter. The hopping is linked to the electronic density of states (DOS) and the electronic wave functions of localized states. The introduction of a NCC insulating layer on the surface of GO was not expected to favour delocalization of carriers, but an increased level of localized states away from the Fermi energy level ($E_F$). Thus, localized disorders in NCC/GO composites were expected to enhance midgap energy states. Indeed, this was observed as a definite change in the UV-vis-NIR spectra of the composites at the variable NCC composition (FIG. 2). From these spectra a noticeable induction of band gap characteristics is seen to occur at 10 mass % NCC composition with a relatively higher absorption in the visible/NIR region. It can be argued that the increase in mass % NCC incorporation has resulted in increased intra- and interfacial displacements.

At a molecular level these torsional effects strongly disturb the intermolecular electronic couplings, and the degree of influence depends on the bonding-antibonding characteristics of the frontier molecular orbitals; the highest occupied molecular orbital (HOMO) or the lowest unoccupied molecular orbital (LUMO). The changes in the magnitude of the interactions between adjacent molecules or chain segments, with regard to their relative locations and alignments (known as off-diagonal disorder), see (FIG. 1), generates a distribution of electronic couplings within the composites layers inducing conducting pathways through the thin film as dead-ends for the charges. Considering the GO layer alone, the presence of oxygen and hydrogen atoms brings about diagonal disorder by forming pseudo-finite-size conjugated segments with different lengths and hence dissimilar HOMO and LUMO energies. These diagonal disorders are a creation of electrostatic/polarization effects from surrounding molecules that vary with variations in local packing. These effects may be enhanced by periodic molecular/chain units containing local dipole moments or no permanent dipole. The heteroatoms in the GO monolayer can be argued as mini dipoles and polarizing centres. The cellulose, similarly, has mini dipole centres in regular repeating units. A concentration dependent increase in the degree of both disorders is thus expected in such composites.

By examining FIG. 2 it can be concluded that the optical absorption of the NCC/GO composite is dominated by n-π* rather than π-π* transitions that typically show absorption band between 225 and 275 nm. This points to a new mix of charge carriers, possibly as a consequence of competing electron-electron coupling and electron-phonon coupling. These coupling effects were observed to be dependent on the amount of NCC incorporated in the GO matrix. For instance, 1 mass % NCC and 5 mass % NCC composition do not have a shoulder, whereas 10 mass %, 20 mass % and 50 mass % NCC have shoulders at 655, 445 and 393 nm respectively. This indicates a significant contribution of conduction electrons with photon energy in the visible/near-UV range but this contribution decreases with increase in mass % NCC. The typical absorption spectrum of GO is characterized by π-π* maxima around 230 nm and a shoulder at about 300 nm usually assigned to n-π* transitions of C—O; this was not observed for these composites. At all considered compositions no clear absorption edge was observed, signifying the lack of a distinct bandgap. However, by taking into account the nanometre-scale $sp^2$ carbon clusters on the GO skeletons, which are electron-rich clusters, and since $sp^3$ carbon sites are barriers for carriers, electrons are confined in discrete packs. On the other hand, the cellulose structure contains purely $sp^3$ carbon trap edge sites. The only participative electrons are the lone pairs on the oxygen. Consequently, the band gap energy of the composite is directly correlated to the amount of NCC incorporated into the GO films.

Therefore, it can be inferred that the NCC/GO films contain both conducting π-states from $sp^2$ transport gaps and the σ-states of its $sp^3$ traps. The presence of defects, arising from incorporated oxygen atoms, Stone-Wales defects, and holes, may limit the electronic quality of the composite. As a result, the occurrence of topologically nontrivial states on GO sheets is impossible. Hence, charge mobility across the NCC/GO thin films is likely to be scattered or trapped by $sp^3$ carbon sites, defects, film junctions, and other structural imperfections and impurities. However, the inventors are aware of reports that indicate ferromagnetic (FM) order, spin-orbit coupling (SOC), and special assemblies are likely to bring about anomalous quantum Hall (AQH) effects. This makes these topologically insulating materials, like NCC/GO composite, suitable for the fabrication of low-energy consuming electronic appliances. The electrical conductivity in these n-electron systems require enhanced intermolecular exchanges by way of intermolecular overlap of π-orbitals, which reduces the HOMO-LUMO gap and increases the number of charge carriers. The dominant charge carrier determines the type of semiconductor: either electron (n-type) or hole (p-type).

Figure 3:
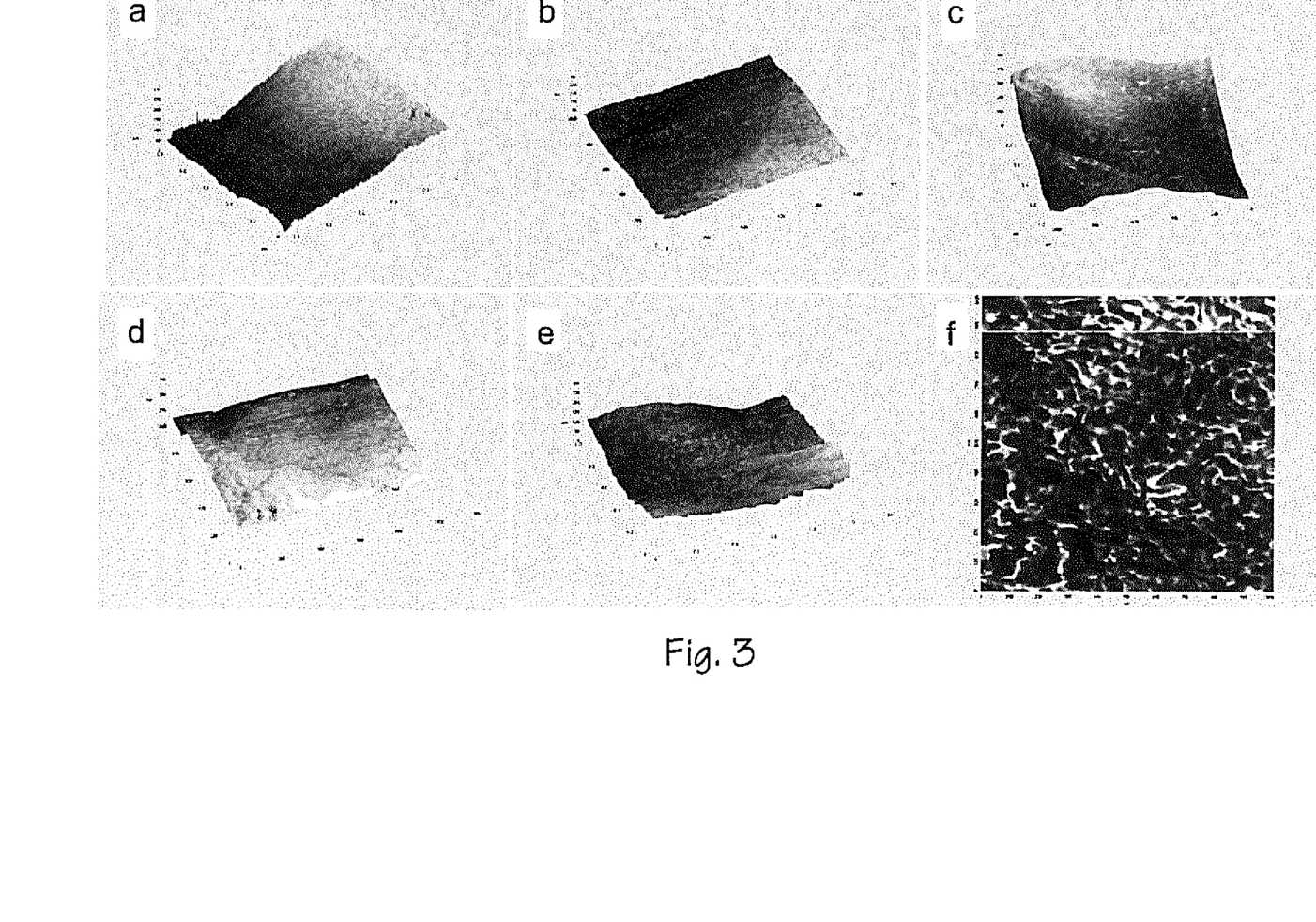
FIG. 3 shows, in respect of the Example, 3D atomic force microscopy images (a) 1 mass % NCC/GO, (b) 5 mass % NCC/GO, (c) 10 mass % NCC/GO, (d) 20 mass % NCC/GO and (e) 50 mass % NCC/GO and (f) 2D image of 20 mass % NCC/GO showing honey comb structures.

The 1 μm by 1 μm atomic force microscopy images (FIG. 3) indicated different topological surface morphology for the different mass percent composition of NCC/GO composites. Notably the 1 mass % NCC/GO composite showed spiky 3D topography that gradually smoothens at 5 mass % attaining some degree of alignment at 20 mass % NCC/GO composite (FIG. 3a-d). The alignment is disrupted by intense wrinkling at 50 mass % NCC/GO composite; spiky edges are also observed (FIG. 3E). A 2D, 1 μm by 1 μm image of 20 mass % NCC/GO composite shows honeycomb structures that may resemble graphene sheet (FIG. 3f). The formation of these structures indicates a definite electronic interaction between the OH groups on the NCC and the oxygen carrying groups on the GO fabric. The $sp^2$ rich graphene sheet is characterised by high electron density and regular pentagonal, heptagonal shaped honey comp structures. The observed structures at 20 mass % NCC/GO composition are slightly deformed implying no reformation of $sp^2$ hybridized carbons but superficial re-organization of the NCC to form interconnected channels. The established channels could play a role in the electron injection into the conductive band of the composite making it manifest n-type organic semiconductor characteristics.

Figure 4:
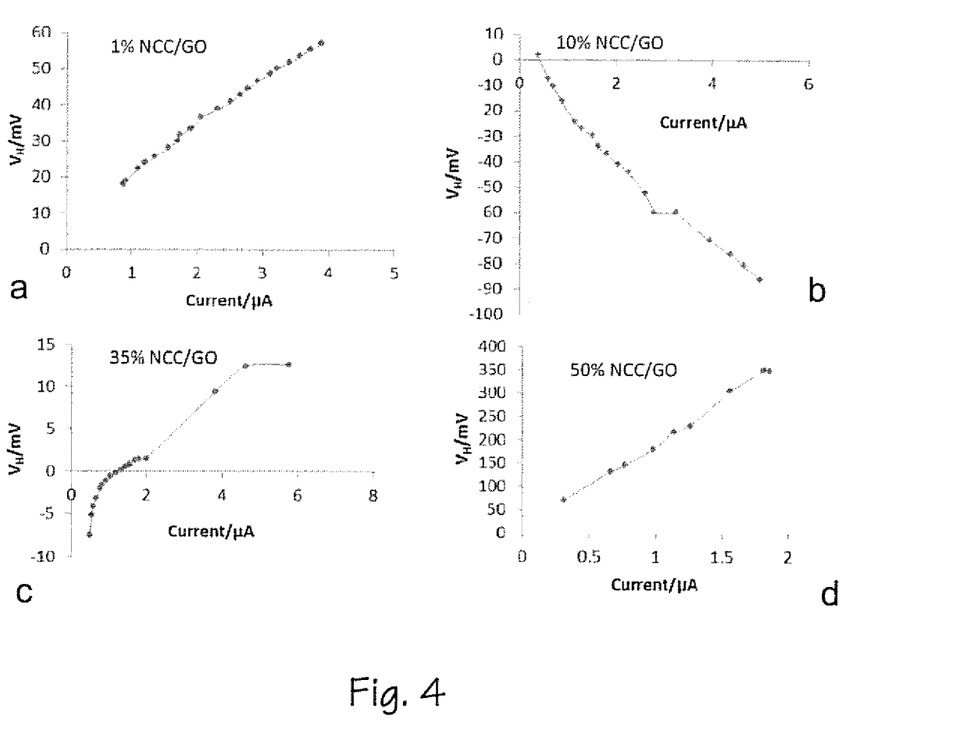
FIG. 4 shows, in respect of the Example the relationship between Hall voltage and input current at variable compositions of NCC in GO.

GO thin films are typically p-type semiconductors with a large positive threshold voltage ($V_{th}$). However, in the absence of adsorbed and/or trapped water molecules, they show a negative shift in $V_{th}$. This implies that desorption of not only oxygen but also polar guests changes the intrinsic characteristics as observed in single-walled carbon nanotube-based devices. In this work, a similar but % NCC concentration dependent, transformation occurs pointing to site capacity and threshold limits. As seen from the UV-vis-NIR spectra (FIG. 2), a 10 mass % NCC composition not only changes the charge carrier characteristics but also induces a higher charge parameter as indicated by higher absorption. The absorbance units are much higher and the estimated mobility is correspondingly high. The reversal of $V_{th}$ observed on re-exposure to moisture back to positive values is demonstrated by the higher % NCC composition indicating a critical composition exists beyond which the sites are saturated and normal multiple trap and release behaviour resumes. At a composition of 35 mass % NCC/GO a change from negative $V_H$ is observed which transits to positive as current is increased (FIG. 4). It can be argued that the adsorbed oxygen and polar groups give rise to a larger amount of accessible hopping sites, with the consequence of increasing the hopping probability and thereby the carrier mobility. It can be proposed that adsorption or chemisorption of chemical species may have a consequence of populating one carrier type or compensate existing carriers. An improved carrier mobility facilitated by hopping or limited mobility triggered by scattering centres may be observed. In essence, n-type and p-type charge characteristics are attainable in GO composites provided the symmetry of ambipolar characteristics is broken. Traditionally, it has been done by doping an ambipolar device for instance, a silicon chip, to p-type or n-type depending on the dopant. Such doping techniques are time-consuming and labour intensive. In this Example, it has been demonstrated that GO can be tuned to one type of charge carrier depending on the composition of NCC guests, thereby paving the way for large scale production of semiconducting devices cheaply and from renewable materials. Stability of the fabricated devices is expected at ambient conditions as observed from good reproducibility of data obtained on these composite films.

The relativistic charge-carrier transport is not available in pure GO, and the optical and electronic properties of GO are subtly dependent on the degree of uniform spread of the functional groups. Since the electronic coupling between adjacent molecules primarily depends on their packing, there exists no obvious relationship between molecular size and charge mobility. Therefore, electronic coupling between adjacent molecules may not be directly related to the degree of spatial overlap between adjacent molecules but instead related to the degree of wave function overlap. As a consequence of the differences in oscillation periods for electron and hole transfer integrals, even small translations can lead to situations where the couplings for electrons are larger than for holes, and hence where electrons can possibly be more mobile than holes. In an ideal defect-free environment charge transport is determined by interplay between electronic and electron-vibration (phonon) interactions. However, in large organic semiconductors/composites, like the NCC/GO, electron-phonon coupling does not cause just perturbations but forms quasiparticles, the polarons. Here, the electronic charge is enveloped by the phonon clouds (FIG. 1) and any small translation of atoms from their mean position changes the microscopic parameters. Indeed in a case of the observed emergence of honeycomb structures at 20 mass % NCC/GO (FIG. 3f) is evidence of changes in intra- and interlayer interactions, affecting structural parameters. The dependence of the system parameters on vibration (phonon) coordinates is known as electron-phonon coupling. It is known that both local and nonlocal electron-phonon communications are critical and responsible for the time-dependent variation of the transport parameters and, therefore, introduce a dynamic disorder in local and nonlocal electron-phonon couplings, corresponding to diagonal and off-diagonal dynamic disorder mechanisms, respectively. The presence of states with nonlocal order parameters creates a topological ordered phase; with significant low field energy. Reports indicate topological phases have potential practical applications with suggestions that a topological quantum computer may use 2D quasi-particles with the ability to form braids. A braids logic gate formulated computer has the ability to encode data non-locally thereby minimizing local incoherence effects.

The NCC/GO composite can be regarded as a topological insulator, because of the demonstrated gapless edge states, that arise from non-interacting fermions, thus, making it a time reversal invariant topological insulator with a bulk energy gap and gapless excitations of an odd number of Dirac cones on the surface. Traditionally, the time reversal symmetry is normally broken by surface coating a topological insulator with a thin magnetic film to create an energy gap. When an electric field is applied on such a surface, a quantized Hall current is induced, which in turn causes magnetic polarization; similarly, if an external magnetic field is applied, an electric field is induced. Measuring Hall effects provides a means of determining the major charge carriers and inherent mobility in such materials. Generally, hopping carriers are affected by a transverse Hall electric field and move in the direction opposite to the Lorentz force acting on the charge carriers. The sign of the measured electric field in volts, known as the Hall voltage, depends on the majority charge carrier. A negative Hall voltage indicates electrons are the majority charge carrier and a positive sign shows "holes" are the dominant charge carriers. In FIG. 4 the Hall voltage current relationships are shown. The "hole" dominated transport has a positive slope and the "electron" dominated shows a negative gradient. From FIG. 4, samples with 1, 5 and 50 mass % NCC/GO composites showed "hole" conduction (p-type), whereas 10 and 20 mass % NCC/GO composites showed "electron" conduction (n-type) as the dominant charge carriers. The 35 mass % NCC/GO composite showed a transition to p-type at high currents (FIG. 4). This can be attributed to thermal destruction of the extended electronic band of states arising from current flow. The observed AQH effect on these composites indicates gapped surface states which are normally associated with backscattering-protected edge transport channels in the absence of an external magnetic field. This is a further evidence of topological phase modification. The surfaces of 10 mass % and 20 mass % NCC/GO appear smoother with the 20 mass % NCC/GO showing longitudinal alignment in 3D (FIGS. 3c and d). In this regard, it is speculated that there is possible occurrence of exotic non-Abelian excitations on the surface of these composites. The characteristic charge carriers in these π-conjugated scaffolds have their spin $-\frac{1}{2}$ polaron transport mediated by hopping. The regulatable hopping phenomenon arising from localized electronic states, observed in this work, positions these composites as a potential candidate for the fabrication of tuneable next-generation low-dissipation spintronic devices.

The search for reasonably conductive organic semiconductors has employed various strategies including meticulously planned doping, and forming composites with conductive fillers. These efforts have yielded mostly p-type materials; however, air-stable, n-type materials have been elusive. The introduction of n-type polymers has been a daunting task because of big phase separations. The inventors have demonstrated that it is possible to form well patterned p- and n-type regions on the same film by varying the concentration of NCC in an NCC/GO composite. This demonstrates that the fabrication of a unipolar n-type material is feasible and stable at ambient conditions essentially producing a composite whose majority carriers can be tuned by varying the relative composition of a guest species. Thus, this composite can be useful as a transport layer in diodes, transistor technology which is a cornerstone for complementary logic and circuitry, and also be used as the p- and n-probes of a thermoelectric generator.

The variation in the composite composition creates novel charge carrier characteristics and consequently unique topological electrical conductivity properties. The composite films present long-range conductivity, a potent feature suitable for topological computing and radio frequency phase modulation applications. The optical saturation characteristics demonstrated by the films also give them an edge for potential use in dual-wavelength Q-switched fibre lasers.

Composition dependent charge switch carrier characteristics have thus been demonstrated, with potential for radio frequency phase charge which is useful for phase modulation, for braids computing applications and as a saturable absorber in dual wave length Q-switched fibre lasers.

The inventors have thus demonstrated that NCC/GO composites are ambipolar, but can exhibit unipolar, i.e. p- and n-type charge carrier, conductivity. Furthermore, the inventors have shown that changing the concentration of NCC in the composite effectively switches from p-type to n-type composites and vice versa depending on the ratio of NCC:GO. Additionally, the inventors have demonstrated that the fabrication of an air-stable n-type organic semiconductor device is feasible. This invention thus provides a new approach to realize anomalous quantum Hall effects on graphene-based composites and a means to electrically control topological states which is very necessary for cutting edge nanoelectronics, optoelectronics and spintronics applications. The device fabrication can be easily scaled-up for industrial applications.

What is claimed is:

1. An electroconductive composite, comprising:
a matrix of nanocrystalline cellulose (NCC) and graphene oxide (GO), with the matrix being, in at least a region thereof, unipolar by having, in that region, n-type, or at least predominantly n-type, charge carrier conductivity, wherein a mass concentration of NCC in the electroconductive composite in that region of the matrix is >7% and <35%; and
wherein the electroconductive composite has at least one other region in which a mass concentration of NCC in the electroconductive composite in said at least one other region of the matrix is ≤7% or ≥35%, with the electroconductive composite then in said at least one other region having a p-type, or at least a predominantly p-type, charge carrier conductivity.

2. The electroconductive composite of claim 1, wherein the electroconductive composite contains no elemental dopant for n-type doping, and/or no elemental dopant for p-type doping.

3. The electroconductive composite of claim 1, which is in the form of an electroconductive film composite, obtained by dispersing graphene oxide (GO) and nanocrystalline cellulose (NCC) in a carrier liquid to form a suspension, producing a raw matrix body in the form of a film from the suspension, and drying the raw matrix body to form an electroconductive film composite.

4. An artifact which includes an electroconductive composite according to claim 1.

5. A process for producing an electroconductive composite, comprising:
   dispersing graphene oxide (GO) in a carrier liquid to form a dispersion or solution;
   adding nanocrystalline cellulose (NCC) to the dispersion or solution to form a suspension, a mass concentration of NCC in the suspension being selected to obtain an electroconductive composite comprising a matrix of NCC and GO, with the matrix being, in at least a region thereof, unipolar by having, in that region, n-type, or at least predominantly n-type, charge carrier conductivity;
   producing a raw matrix body in the form of a film from the suspension;
   drying the raw matrix body to obtain an electroconductive composite comprising a matrix of NCC and GO, with the matrix being, in at least a region thereof, unipolar by having, in that region, n-type, or at least predominantly n-type, charge carrier conductivity, wherein a mass concentration of NCC in the electroconductive composite in that region of the matrix is >7% and <35%; and
   wherein the electroconductive composite has at least one other region in which a mass concentration of NCC in the electroconductive composite in said at least one other region of the matrix is ≤7% or ≥35%, with the electroconductive composite then in said at least one other region having a p-type, or at least a predominantly p-type, charge carrier conductivity.

6. The process of claim 5, wherein the carrier liquid is water and/or in which the electroconductive composite is an electroconductive thin film composite.

7. The process of claim 5, wherein the dispersion is obtained by ultrasonically mixing the GO in the carrier liquid.

* * * * *